US 10,201,865 B2

(12) United States Patent
Yamaguchi et al.

(10) Patent No.: US 10,201,865 B2
(45) Date of Patent: Feb. 12, 2019

(54) PORTABLE ELECTRIC CUTTER

(71) Applicant: HITACHI KOKI CO., LTD., Tokyo (JP)

(72) Inventors: Hayato Yamaguchi, Hitachinaka (JP);
Hideyuki Tanimoto, Hitachinaka (JP);
Kenichirou Yoshida, Hitachinaka (JP);
Shinji Kuragano, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 15/722,805

(22) Filed: Oct. 2, 2017

(65) Prior Publication Data

US 2018/0021865 A1    Jan. 25, 2018

Related U.S. Application Data

(63) Continuation of application No. 14/379,184, filed as application No. PCT/JP2013/001653 on Mar. 13, 2013, now Pat. No. 9,808,872.

(30) Foreign Application Priority Data

Mar. 15, 2012  (JP) .................................. 2012-059182

(51) Int. Cl.
*B23D 45/16*    (2006.01)
*B25F 5/00*    (2006.01)

(52) U.S. Cl.
CPC .............. *B23D 45/16* (2013.01); *B25F 5/008* (2013.01)

(58) Field of Classification Search
CPC ...... B23D 45/00; B23D 45/02; B23D 45/021; B23D 45/022; B23D 45/024; B23D 45/14;
(Continued)

(56) References Cited

U.S. PATENT DOCUMENTS

| 6,123,158 A | 9/2000 | Steffen |
| 2003/0117030 A1 | 6/2003 | Agnes et al. |

(Continued)

FOREIGN PATENT DOCUMENTS

| DE | 102007000290 A1 | 11/2008 |
| DE | 102007000524 A1 | 4/2009 |

(Continued)

OTHER PUBLICATIONS

Decision for Refusal Japanese Patent Application No. 2014-214142 dated Nov. 4, 2015 with English translation.

(Continued)

*Primary Examiner* — Phong Nguyen

(74) *Attorney, Agent, or Firm* — McDermott, Will & Emery LLP

(57) ABSTRACT

A portable electric cutter includes a housing in which a motor is accommodated, a saw blade driven to rotate by the motor, a base coupled to the housing and having a bottom surface slidable on a surface of a material to be cut, a fan driven to rotate by the motor, a driving circuit for switching power supplied to the motor, and a control circuit for controlling the driving circuit. A circuit board on which the driving circuit, the control circuit and others are mounted is provided, motor cooling air vents are provided in the housing on a side opposite to the saw blade, and circuit board cooling air vents are provided in the housing on the side opposite to the saw blade.

7 Claims, 17 Drawing Sheets

(58) Field of Classification Search
CPC ........ B23D 45/16; B23D 47/00; B23D 47/02; B27B 5/00; B25F 5/008
USPC .. 30/370–377, 388–391, 514, 263, 276, 273
See application file for complete search history.

(56) References Cited

U.S. PATENT DOCUMENTS

| | | |
|---|---|---|
| 2004/0124721 A1 | 7/2004 | Pfisterer et al. |
| 2008/0290745 A1 | 11/2008 | Riedl |
| 2009/0103263 A1 | 4/2009 | Fuchs et al. |
| 2009/0272242 A1 | 11/2009 | Okada et al. |
| 2011/0148227 A1 | 6/2011 | Schuele et al. |
| 2011/0171887 A1 | 7/2011 | Tanimoto et al. |
| 2013/0185947 A1 | 7/2013 | Barkley et al. |
| 2013/0333228 A1 | 12/2013 | Ota et al. |

FOREIGN PATENT DOCUMENTS

| | | |
|---|---|---|
| EP | 1081827 A1 | 3/2001 |
| EP | 1398865 A2 | 3/2004 |
| EP | 1541293 A1 | 6/2005 |
| EP | 1715565 A1 | 10/2006 |
| EP | 2371493 A1 | 10/2011 |
| EP | 2682214 A1 | 1/2014 |
| JP | 11-129169 A | 5/1999 |
| JP | 2003-209960 A | 7/2003 |
| JP | 4113538 B2 | 7/2008 |
| JP | 2010-173042 A | 8/2010 |
| JP | 2010-201516 A | 9/2010 |
| JP | 2011-036935 A | 2/2011 |
| JP | 2012-000735 A | 1/2012 |
| JP | 2012-178945 A | 9/2012 |

OTHER PUBLICATIONS

Notification of Reasons for Refusal Japanese Patent Application No. 2014-214142 dated Aug. 5, 2015 with English translation.
Kazuo Nagatake, "Practical Pocket Book about Motors, Motor and Inverter Technology for Home Appliances", Apr. 28, 2000, Issued by Nikkan Kogyo Shimbun, Ltd., Front Cover, Contents, pp. 11, 33-40, 86-87 & 161-166.
International Search Report and Written Opinion issued in Application No. PCT/JP2013/001653 dated Jun. 6, 2013.
Report of Reconsideration by Examiner before Appeal Japanese Patent Application No. 2014-214142 dated Mar. 9, 2016 with English translation.
Notice of Allowance issued in U.S. Appl. No. 14/379,184, dated Jul. 19, 2017.
Final Office Action issued in U.S. Appl. No. 14/379,184, dated Feb. 17, 2017.
Non-Final Office Action issued in U.S. Appl. No. 14/379,184, dated Aug. 30, 2016.
Final Office Action issued in U.S. Appl. No. 14/379,184, dated Mar. 29, 2016.
Non-Final Office Action issued in U.S. Appl. No. 14/379,184, dated Oct. 5, 2015.

PORTABLE ELECTRIC CUTTER

CROSS REFERENCE TO RELATED APPLICATIONS

This is a Continuation Application of U.S. patent application Ser. No. 14/379,184, filed Aug. 15, 2014, which is a National Stage Application of PCT International Application No. PCT/JP2013/001653 filed on Mar. 13, 2013, which is based on and claims priority of Japanese Patent Application No. 2012-059182 filed on Mar. 15, 2012. The entire disclosures of the above-identified applications, including the specifications, drawings and claims are incorporated herein by reference in their entirety.

TECHNICAL FIELD

The present invention relates to a portable electric cutter such as a portable electric round saw, and particularly relates to a cooling structure of a circuit board for driving a motor.

BACKGROUND ART

In recent years, the use of a brushless motor for a portable electric round saw has been studied for the purpose of reduction in size and weight and high efficiency. In general, the portable electric round saw has a structure including a housing with a handle on its top, a round saw driven to rotate by a motor accommodated in the housing, and a base coupled to the housing and slidable on a surface of a material to be cut. Particularly when a brushless motor is adopted as a motor, it is necessary to take measures for securing of the space to dispose a circuit board for driving the brushless motor and heat dissipation thereof.

Japanese Patent Application Laid-Open Publication No. 2010-173042 (Patent Document 1) shows an example of an electric power tool in which a brushless motor by which a polishing grind stone is driven to rotate is accommodated in a cylindrical housing grasped by a hand, and a motor driving circuit separated into a plurality of boards is accommodated at a position inside the housing on the back side of the motor opposite to a tip side of the housing at which the polishing grind stone is provided.

CITATION LIST

Patent Literature

PTL 1: Japanese Patent Application Laid-Open Publication No. 2010-173042

SUMMARY OF INVENTION

Technical Problem

Incidentally, a portable electric round saw does not have an external form using a relatively long cylindrical housing like that described in the Patent Document 1 and uses a very high power motor. Therefore, the volume including elements of a circuit board for driving the motor is increased, and some ingenuity is required for the securing of the space to dispose the circuit board for driving the motor and the cooling thereof. Furthermore, the shape of the housing that does not affect the operability of the portable electric round saw is necessary.

The present invention has been created in consideration of such circumstances, and an object of the present invention is to provide a portable electric cutter capable of securing a space to dispose a circuit board for driving a motor and successfully cooling the circuit board without impairing the operability and greatly changing the shape of a housing in which the motor is accommodated.

Solution to Problem

A portable electric cutter according to an embodiment is a portable electric cutter provided with a motor, the portable electric cutter includes a housing in which the motor is accommodated, a saw blade driven to rotate by the motor, a base coupled to the housing, having a bottom surface slidable on a material to be cut, and having an opening through which the saw blade can protrude downward from the bottom surface, a fan driven to rotate by the motor and cooling the motor by fan air generated by the rotation, a driving circuit including switching elements for switching power supplied to the motor, a control circuit for controlling the driving circuit, and a circuit board on which one or both of the driving circuit and the control circuit is mounted, and motor cooling air vents are provided in the housing on a side opposite to the saw blade, and circuit board cooling air vents are provided in the housing on the side opposite to the saw blade.

A portable electric cutter according to another embodiment is a portable electric cutter provided with a motor, the portable electric cutter includes a housing in which the motor is accommodated, a saw blade driven to rotate by the motor, a base coupled to the housing, having a bottom surface slidable on a material to be cut, and having an opening through which the saw blade can protrude downward from the bottom surface, a fan driven to rotate by the motor and cooling the motor by fan air generated by the rotation, a driving circuit including switching elements for switching power supplied to the motor, and a control circuit for controlling the driving circuit, and a circuit board on which one or both of the driving circuit and the control circuit is mounted is disposed at a position on a lateral side of the motor so as to extend in parallel to a rotation axis of the motor.

Note that the one obtained by arbitrarily combining the constituent elements described above or converting the expression of the present invention between methods and systems is also effective as an aspect of the present invention.

Advantageous Effects of Invention

According to the present invention, it is possible to secure a space to dispose the circuit board and successfully cool the circuit board without impairing the operability and greatly changing the shape of the housing in which the motor is accommodated.

DESCRIPTION OF EMBODIMENTS

Figure 1:
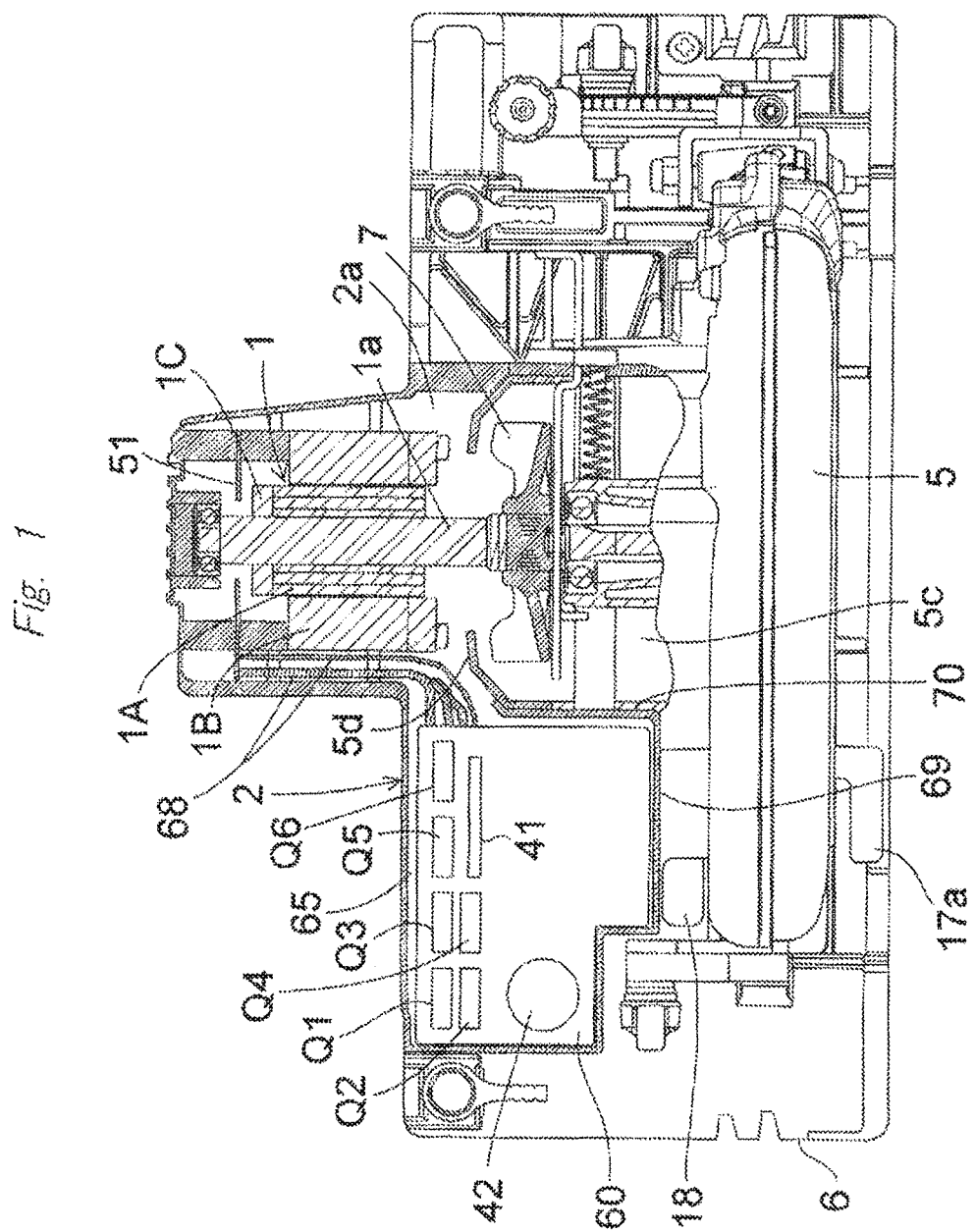
FIG. 1 is a plan view of a portable electric cutter of a first embodiment according to the present invention, in which a principal part is seen in cross section.
Figure 2:
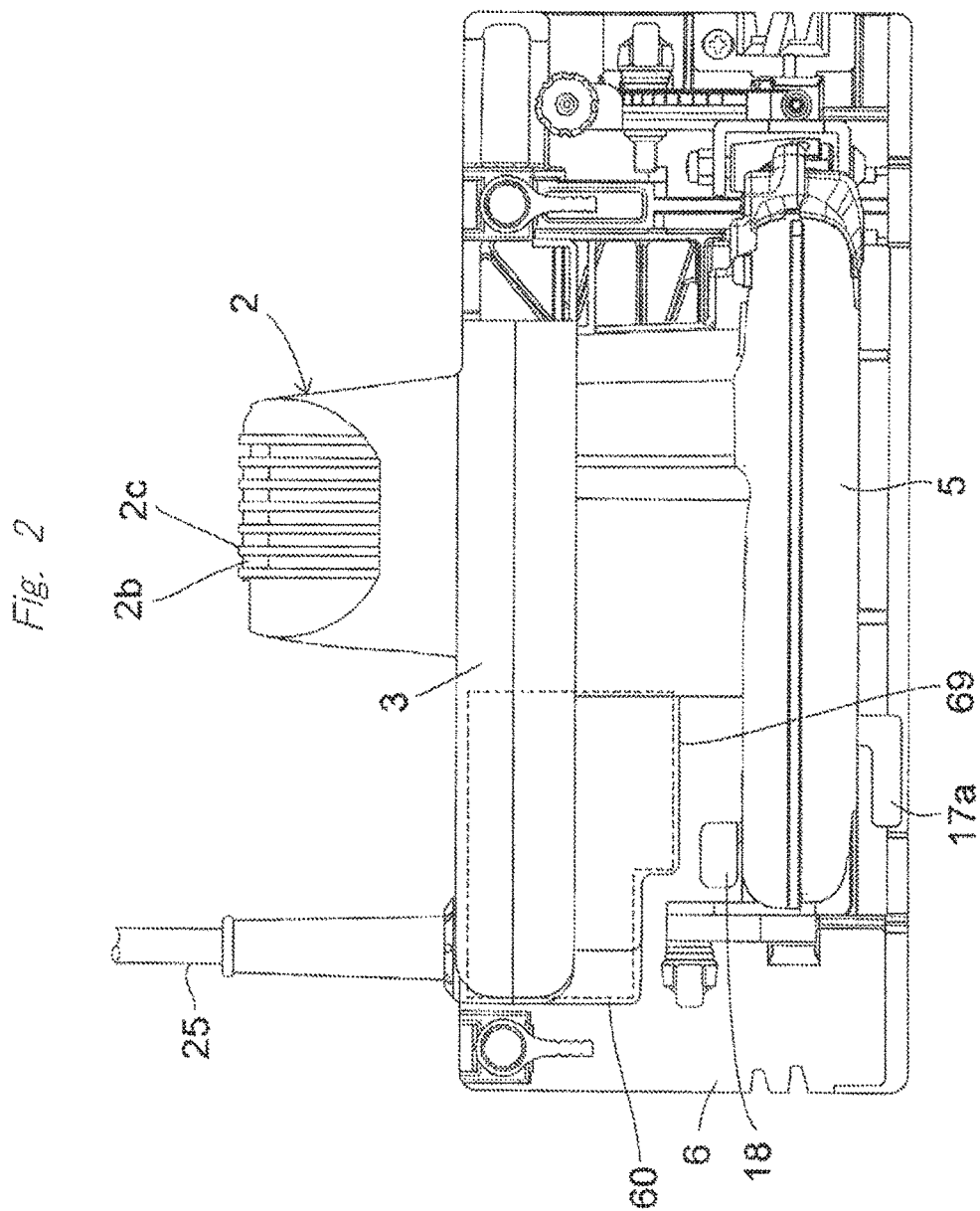
FIG. 2 is a plan view of the portable electric cutter of the first embodiment shown in FIG. 1.

Hereinafter, preferred embodiments of the present invention will be described in detail with reference to drawings. The same or similar constituent elements, members, processes and others shown in the respective drawings are denoted by the same reference signs, and the redundant descriptions are appropriately omitted. Also, the embodiments do not limit the scope of the invention but are provided for illustrative purposes, and all the features and combinations thereof described in the embodiments are not always essential for the invention.

A first embodiment of a portable electric cutter according to the present invention will be described with reference to FIG. 1 to FIG. 6 and FIG. 17. The first embodiment is a portable electric round saw, and it includes a housing 2 in which a brushless motor 1 is accommodated. The portable electric round saw includes a handle 3 integrated with the housing 2 or coupled thereto as a separate member and having a switch 3a shown in FIG. 4 for controlling the drive of the motor 1. The portable electric round saw includes a round saw blade 4 driven to rotate by the motor 1. The portable electric round saw includes a saw cover 5 attached to the housing 2, having a shape covering almost upper half of an outer circumference of the round saw blade 4, and accommodating part of the outer circumference and a side surface on the motor 1 side of the round saw blade 4. The portable electric round saw includes a base 6 coupled to the housing 2 via the saw cover 5, having a bottom surface 6a slidable on a surface of a material to be cut such as a timber, and having an opening through which the saw blade 4 can protrude downward from the bottom surface 6a. The portable electric round saw includes a centrifugal fan 7 fixed to an output shaft 1a of the motor 1, rotated by the drive of the motor 1, and cooling the motor 1 by fan air generated by the rotation. Also, the portable electric round saw has the structure in which a fan air discharge port 5c which discharges the fan air to the inside of the saw cover 5 and a fan guide 5d by which the fan air discharge port 5c is partitioned are provided inside the housing 2. The motor 1 and the fan 7 are disposed in a motor casing 2a corresponding to a part of the housing 2 protruding toward the side opposite to the side on which the saw cover 5 is disposed. The fan guide 5d is provided so as to annularly surround the outer circumference of the fan 7 inside the motor casing 2a. As shown in FIG. 4, slit-like cooling air vents 2b which communicate between the motor casing 2a and the outside are formed in the housing 2 (slit-like openings are formed between protruding ridges 2c). As described above, the cooling air vents 2b provided in the housing 2 on the side opposite to the saw blade function as motor cooling air vents.

Figure 3:
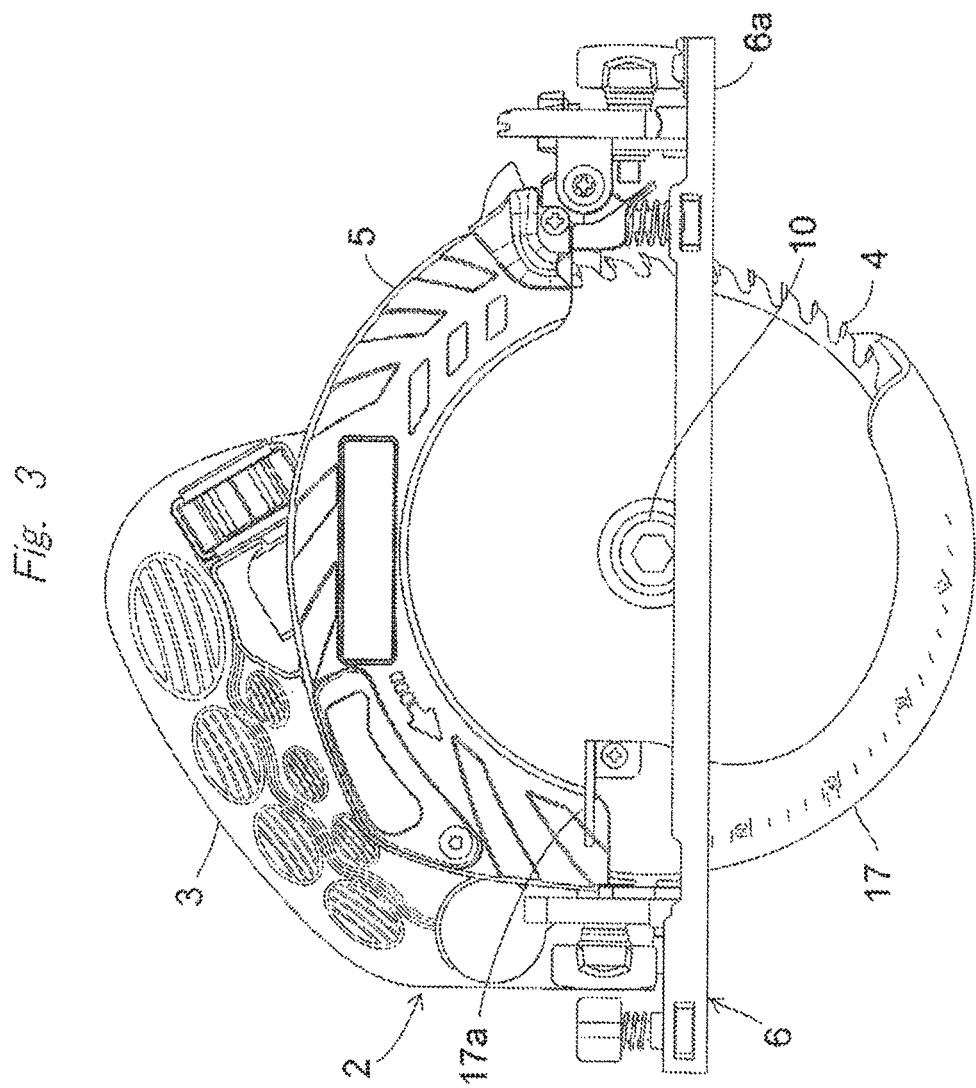
FIG. 3 is a front view of the portable electric cutter of the first embodiment shown in FIG. 1.
Figure 4:
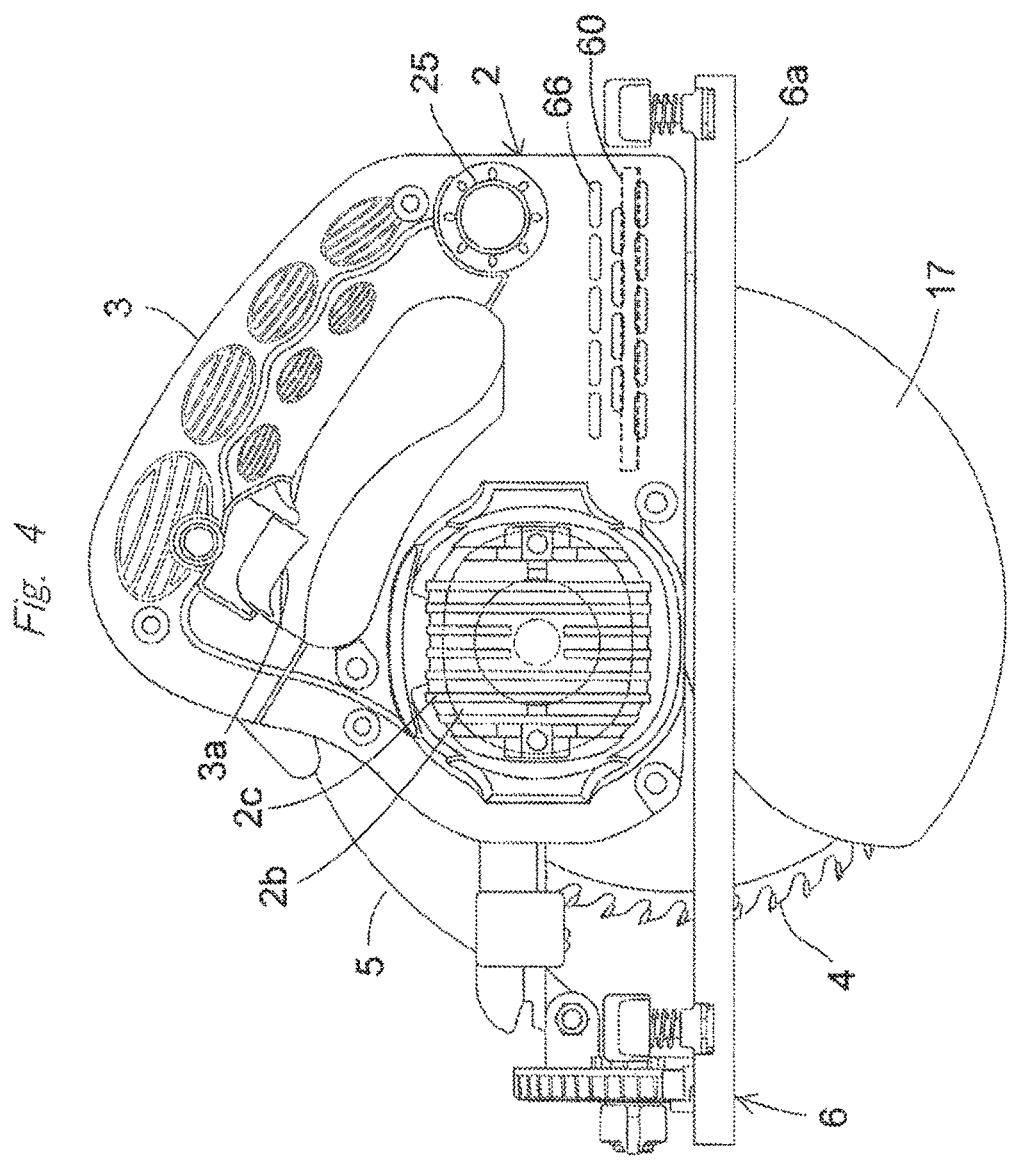
FIG. 4 is a back view of the portable electric cutter of the first embodiment shown in FIG. 1.

As shown in FIG. 3 and FIG. 4, a safety cover 17 which covers almost half of the outer circumference of the round saw blade 4 is provided in the portable electric round saw. The safety cover 17 is held in the saw cover 5 so as to be turned coaxially with a drive shaft 10 of the round saw blade 4, and can be accommodated in the saw cover 5. The safety cover 17 is biased by biasing means such as a spring (not shown), and takes a position at which most part of the safety cover 17 protrudes downward from the bottom surface 6a of the base 6 to prevent the exposure of the outer circumference of the round saw blade 4 in its initial state. In the cutting operation, a front end part of the safety cover 17 in a cutting direction (right side of FIG. 3) is brought in contact with an end part of a material to be cut. Then, by sliding the portable electric round saw in this state in the cutting direction, the safety cover 17 turns so as to be accommodated in the saw cover 5 against the spring, and the round saw blade 4 is exposed on the bottom surface 6a of the base 6. In the case of a cutting process such as a cutout process in which a part that is not continuous with the end face is cut out from the material to be cut, the safety cover 17 can be turned by the operation of a lever 17a by an operator, so that the saw blade 4 can be exposed on the bottom surface 6a of the base 6. The drive shaft 10 to which the round saw blade 4 is attached and fixed works together with the output shaft 1a of the motor 1 via a gear mechanism.

The saw cover 5 described above is coupled to the base 6 so as to interpose the round saw blade 4 in the vicinity of the both end sides in the longitudinal direction of the base 6. Although the details thereof are omitted, a mechanism to adjust the amount of protrusion of the round saw blade 4 from the bottom surface of the base 6 by the operation of a lever 18 and a mechanism to incline the rotation plane of the round saw blade 4 with respect to the base 6 (that is, housing 2 is inclined with respect to the base 6) are provided.

Figure 17:
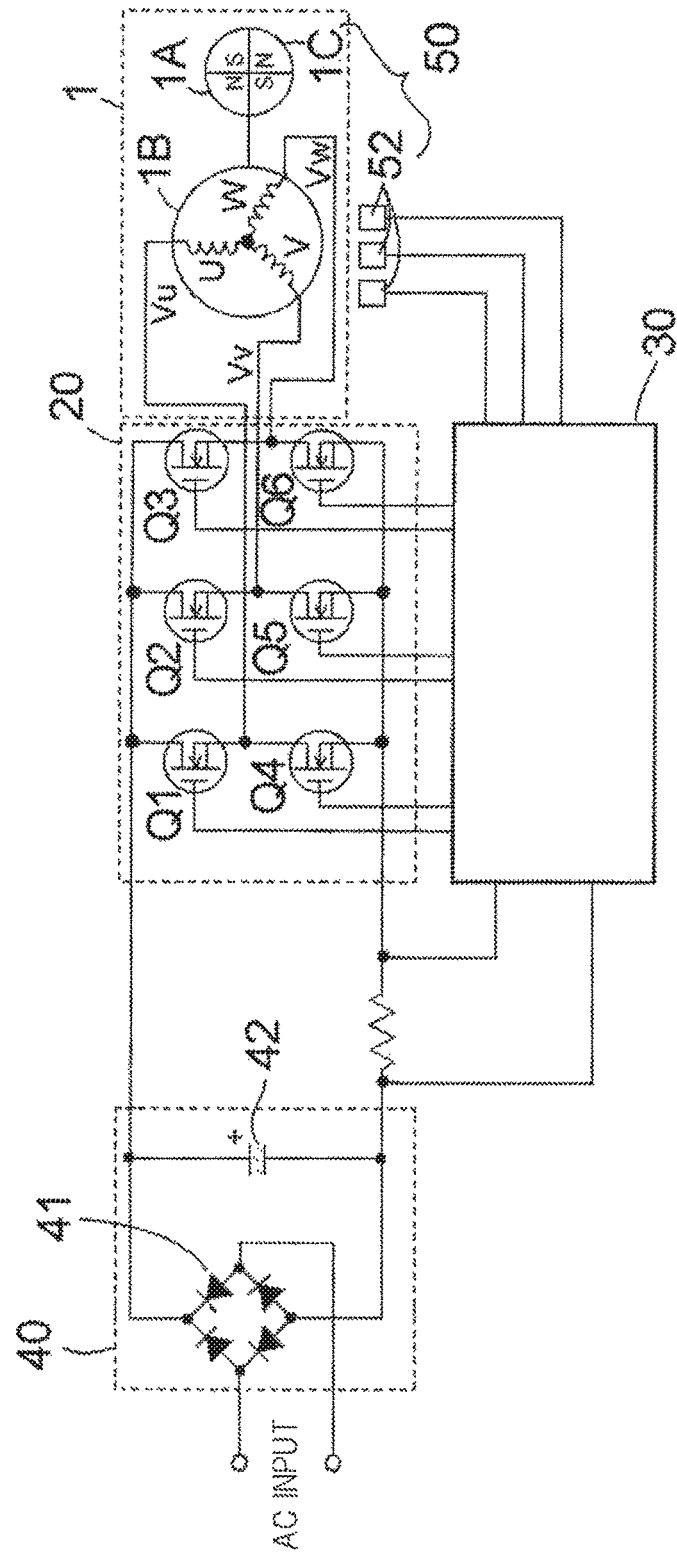
FIG. 17 is a circuit diagram showing an example of a driving circuit and a control circuit for a brushless motor in the respective embodiments.

Thus, the adoption of the brushless motor 1 makes it possible to achieve the high efficiency and reduction in size and weight. The brushless motor 1 needs to have the circuit configuration as shown in FIG. 17. More specifically, the brushless motor 1 requires a driving circuit 20 including switching elements for switching the power supplied to the brushless motor 1 and a control circuit 30 for controlling the driving circuit 20. Also, the brushless motor 1 requires a rectifying and smoothing circuit 40 which converts AC power supply (for example, AC 100 V commercial power supply) input from a power supply cord 25 extending from the back surface of the housing 2 into DC power for driving the brushless motor and a rotation state detection unit 50 which generates a signal in accordance with the rotation position of the brushless motor 1.

In FIG. 1 and FIG. 17, the brushless motor 1 includes a rotator 1A, a stator 1B, and a sensor magnet 1C integrated with the rotator 1A.

The AC power supply input is subjected to the full-wave rectification by a rectifier (for example, diode bridge) 41 of the rectifying and smoothing circuit 40 and is smoothed by a capacitor 42 serving as a smoothing capacitor, and is then supplied to the driving circuit 20. The driving circuit 20 includes an inverter circuit made up of six switching elements Q1 to Q6 such as FETs connected in a three-phase bridge configuration. The control signal from the control circuit 30 is applied to respective gates of the bridge-connected six switching elements Q1 to Q6. Respective drains or sources of the six switching elements Q1 to Q6 are connected to star-connected stator coils U, V, and W of the motor 1. The six switching elements Q1 to Q6 converts the DC voltage supplied to the inverter circuit into three-phase (U phase, V phase, and W phase) voltages Vu, Vv, and Vw by performing the switching in accordance with the control signal and supplies power to the stator coils U, V, and W to start and rotate the brushless motor 1. The control circuit 30 includes, for example, a microcomputer.

The rotation state detection unit 50 includes the sensor magnet 1C integrated with the rotator 1A of the motor 1 and rotation position detection elements 52 (for example, Hall element) disposed on a sensor board 51 shown in FIG. 1 (however, illustration of the rotation position detection element 52 is omitted in FIG. 1). As shown in FIG. 1, the sensor board 51 is disposed at a position behind the motor 1 so as to closely face the sensor magnet 1C. The control circuit 30 receives the signal of the rotation position detection element 52 and transmits the control signal for controlling the drive of the motor 1 to the driving circuit 20.

Figure 6:
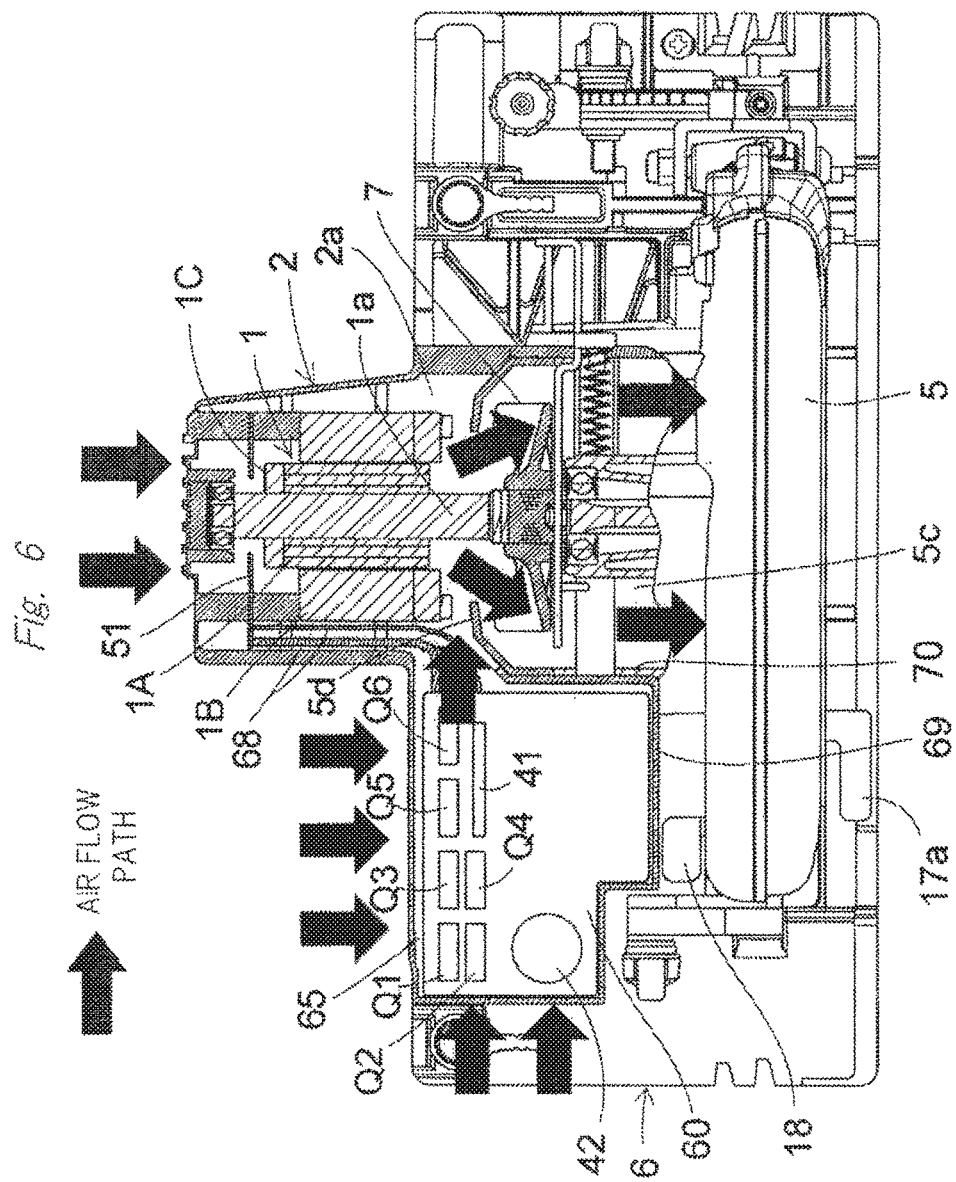
FIG. 6 is a plan view for describing an air flow path in the first embodiment, in which a principal part is seen in cross section.

In the circuit configuration of FIG. 17, in particular, the cooling of the driving circuit 20 which consumes large amount of power and generates large amount of heat becomes a problem. In this first embodiment, as shown in FIG. 1 and FIG. 6, a circuit board 60 in which the driving circuit 20, the control circuit 30, and the rectifying and smoothing circuit 40 are mounted on one board is disposed in a circuit board casing 65 in the housing 1. For example, the switching elements Q1 to Q6, the rectifier 41, the capacitor 42 and others are mounted on an upper side of the circuit board 60. Also, the microcomputer and others of the control circuit 30 are disposed at a position on the board where they are less likely to be affected by these heat generating components. Note that the motor 1, the sensor board 51, and the circuit board 60 are electrically connected to one another by a number of wires 68.

Figure 5:
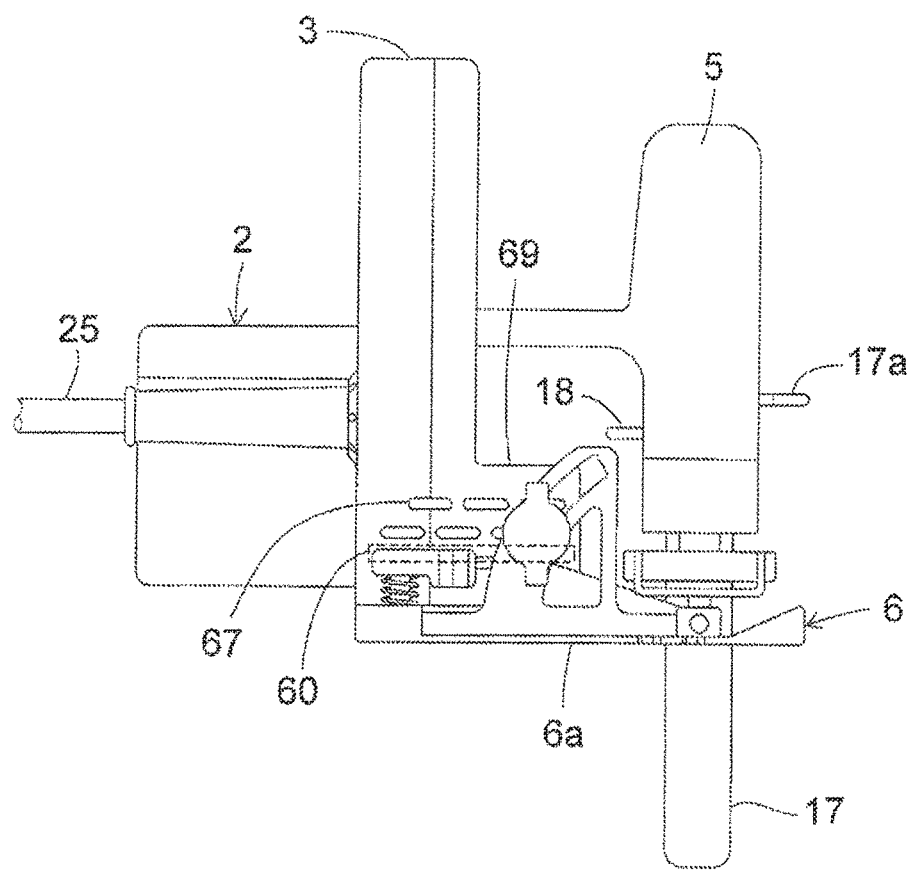
FIG. 5 is a side view of the portable electric cutter of the first embodiment shown in FIG. 1.

The circuit board casing 65 is located at a height position between the handle 3 and the base 6 and is formed inside a protruding portion 69 (protruding toward the saw cover 5 side) provided in a part of the housing 2 located on a radially outer side of the fan 7. The radially outer side of the fan 7 corresponds to the direction orthogonal to the rotation axis of the fan 7. Also, four side surfaces of the circuit board casing 65 are almost surrounded by the outer wall of the housing 2 and a partition wall 70 of the motor casing 2a. Note that, as shown in FIG. 4, a number of circuit board cooling air vents 66 are formed in the housing 2 on the side opposite to the saw blade, and as shown in FIG. 5, a number of circuit board cooling air vents 67 are formed in a side surface of the housing 2. Also, at the back of the fan guide 5d, that is, between a back surface of the fan guide 5d and the outer wall of the housing 2, a space serving as an air flow path which communicates between the motor casing 2a and the circuit board casing 65 is provided. The reason why the circuit board casing 65 is located at a height position between the handle 3 and the base 6 is because the circuit board casing 65 at that position does not disturb the operation by the operator who grasps the handle 3. Also, the reason why the circuit board casing 65 is located on a radially outer side of the fan 7 is because the cooling air reaching the inside of the fan guide 5d from the circuit board cooling air vents 66 and 67 is generated by efficiently utilizing the negative pressure inside the fan guide 5d caused by the rotation of the fan 7.

In the first embodiment described above, in the cutting operation, the worker who grasps the handle 3 turns on the switch 3a in the state where the bottom surface 6a of the base 6 is placed on the material to be cut. Then, the brushless motor 1 is started and the round saw blade 4 is driven to rotate, thereby cutting the material to be cut while sliding the base 6 on the material to be cut.

The cooling of the brushless motor 1 and the cooling of the circuit board 60 after starting the brushless motor 1 are carried out in the manner shown in FIG. 6. More specifically, the centrifugal fan 7 attached and fixed to the output shaft 1a of the motor 1 is rotated, and the fan air for cooling is introduced to the motor casing 2a through the slit-like cooling air vents 2b at the back of the motor 1. The fan air introduced to the motor casing 2a passes through the space between the rotator 1A and the stator 1B of the motor 1, enters the fan guide 5d while cooling the motor 1, and is then discharged to the saw cover 5 side through the fan air discharge port 5c.

Since the inside of the fan guide 5d has the negative pressure relative to the circuit board casing 65 due to the rotation of the fan 7, the fan air is introduced to the circuit board casing 65 through the circuit board cooling air vents 66 and 67 (see FIG. 4 and FIG. 5). The fan air introduced to the circuit board casing 65 passes through the circuit board casing 65 while cooling the circuit board 60 on which the switching elements Q1 to Q6, the rectifier 41, the capacitor 42 and others are mounted, enters the motor casing 2a, and then reaches the inside of the fan guide 5d. Here, since the cooling air which cools the brushless motor 1 and the cooling air which cools the circuit board 60 are taken in through respectively different openings, the brushless motor 1 and the circuit board 60 can be efficiently cooled. Also, the circuit board casing 65 communicates with the motor casing 2a on the downstream side of the cooling air flow path of the brushless motor 1 and the cooling air flow path of the circuit board 60. Therefore, the air heated by cooling one of the brushless motor 1 and the circuit board 60 is not supplied to the other of the brushless motor 1 and the circuit board 60.

According to the present embodiment, the following effects can be achieved.

(1) Since the circuit board 60 for driving the brushless motor 1 is disposed at the position inside the housing 2 located between the handle 3 of the housing 2 in which the motor 1 is accommodated and the base 6 and in a flow path of fan air, it is possible to cool the circuit board 60 without impairing the operability and greatly changing the shape of the housing 2 in which the motor 1 is accommodated.

(2) Since the circuit board 60 is disposed on the radially outer side of the fan 7 when the direction orthogonal to the rotation axis of the centrifugal fan 7 is defined as the radial direction, the fan air entering from the circuit board cooling air vents 66 and 67 to pass through the circuit board 60 can be generated by efficiently utilizing the negative pressure inside the fan guide 5*d* caused by the rotation of the centrifugal fan 7.

(3) Since the circuit board cooling air vents 66 are provided on the side of the housing 2 opposite to the side where the round saw blade is provided, chips of the material to be cut are less likely to enter the housing 2 through the vents 66.

(4) Since the circuit board 60 is located below the handle 3, wire connection to the switch 3*a* on the handle 3 side and the power supply cord 25 can be facilitated.

A second embodiment of the present invention will be described with reference to FIG. 7 to FIG. 11. Since the second embodiment is substantially similar to the first embodiment except the cooling structure of the circuit board, the difference will be described below.

In the second embodiment, the driving circuit 20 and the rectifying and smoothing circuit 40 of FIG. 17 are mounted on a first circuit board (first board) 60A, and the control circuit 30 is mounted on a second circuit board (second board) 60B. The first circuit board 60A is disposed at the position inside the housing 2 located between the handle 3 and the base 6, that is, in a circuit board casing 65A. The circuit board casing 65A is the same as the first embodiment described above in the point that it is formed inside a protruding portion 69A (protruding toward the saw cover 5 side) provided in a part of the housing 2 located on a radially outer side of the fan 7 when the direction orthogonal to the rotation axis of the fan 7 is defined as the radial direction. However, since the control circuit 30 is mounted on another board, the first circuit board 60A can be reduced in size and the protruding portion 69A (protruding toward the saw cover 5 side) provided in a part of the housing 2 can also be reduced in size, and thus the second embodiment is advantageous in operability.

Figure 7:
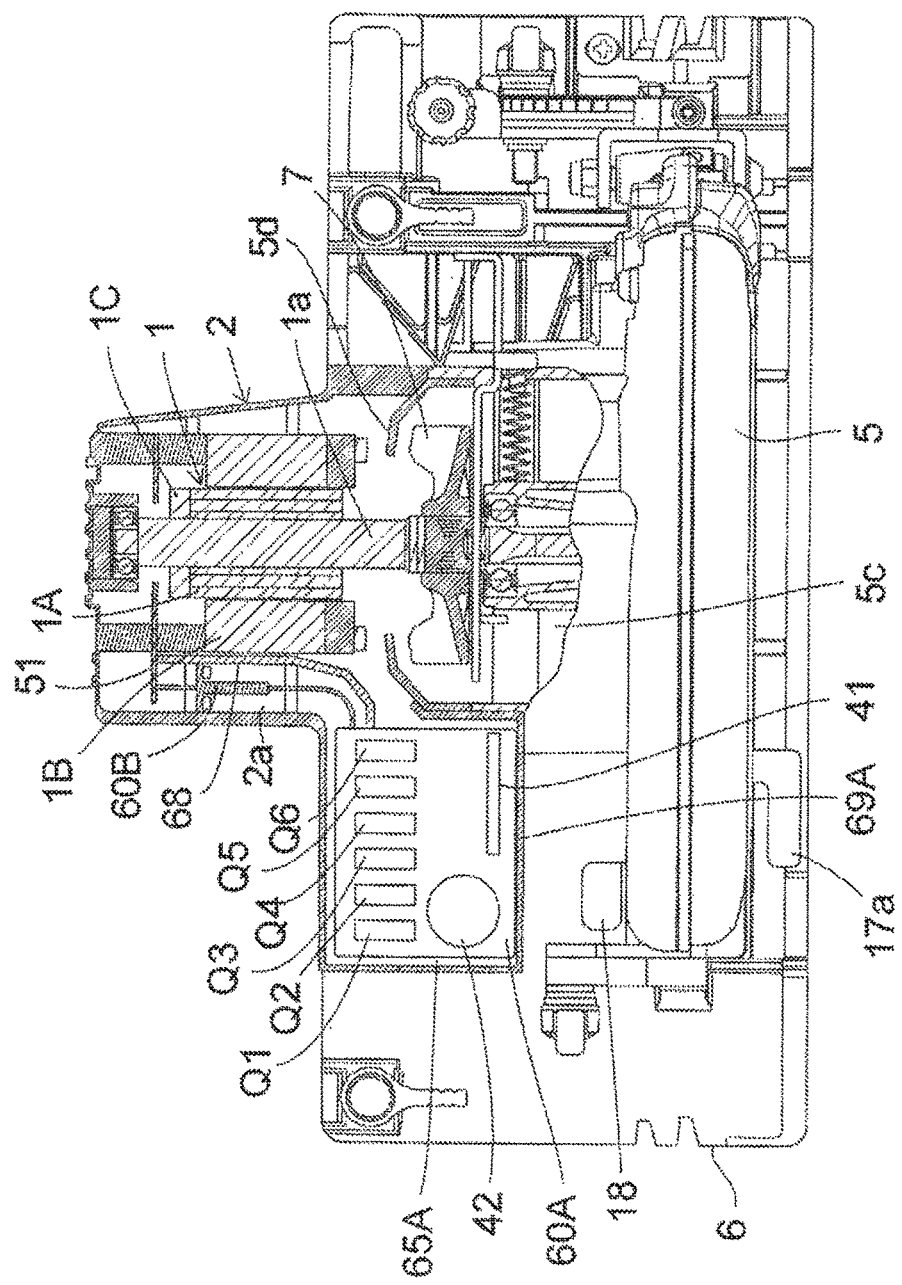
FIG. 7 is a plan view of a portable electric cutter of a second embodiment according to the present invention, in which a principal part is seen in cross section.
Figure 8:
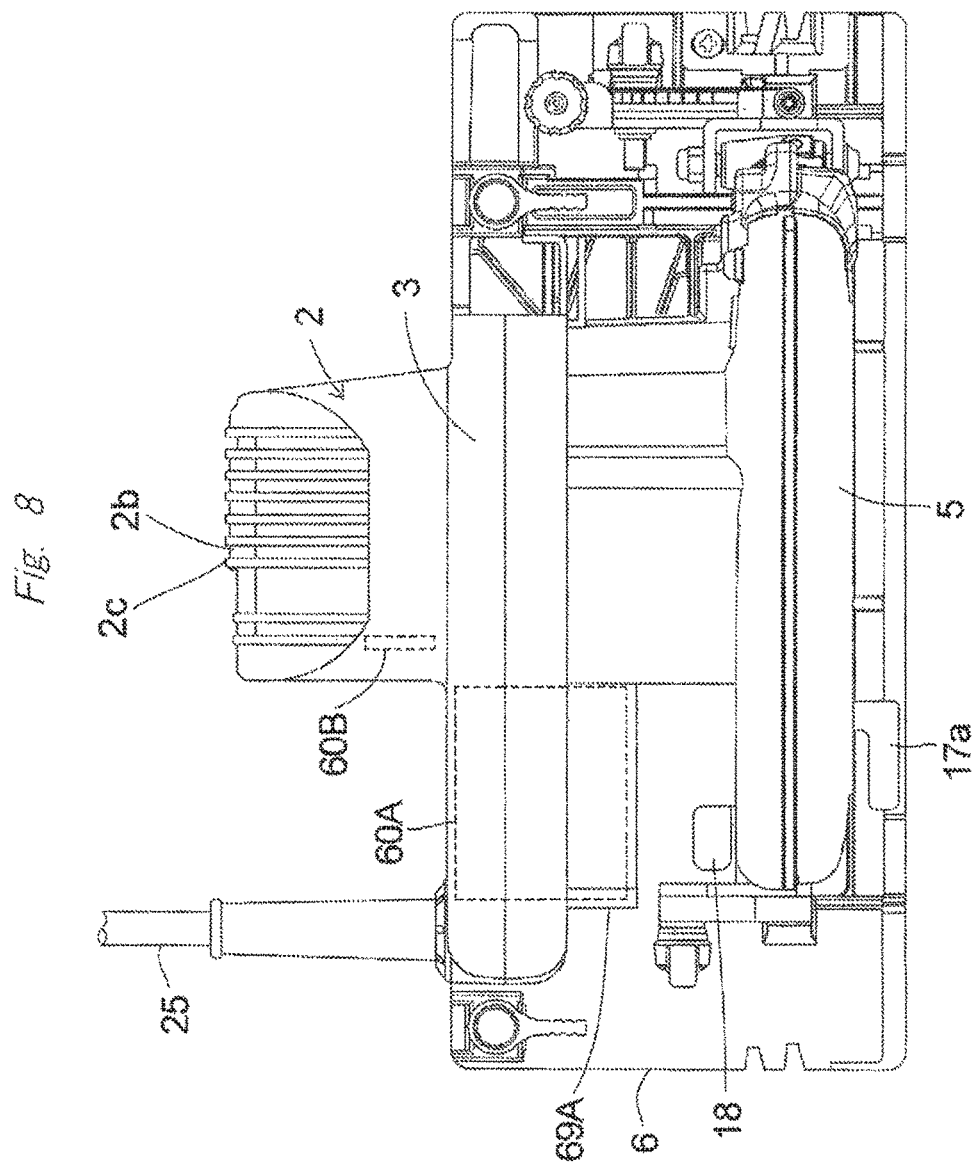
FIG. 8 is a plan view of the portable electric cutter of the second embodiment shown in FIG. 7.

The second circuit board 60B on which the control circuit 30 is mounted is disposed at the position away from the first circuit board 60A, for example, in the space between an inner wall of the motor casing 2*a* and the stator 1B of the motor 1 (disposed vertically with respect to the plane of paper in FIG. 7). In this case, the electrical connection between the rotation position detection element 52 mounted on the sensor board 51 and the control circuit 30 in FIG. 17 is shortened, and the influence of noise or the like can be suppressed.

Figure 11:
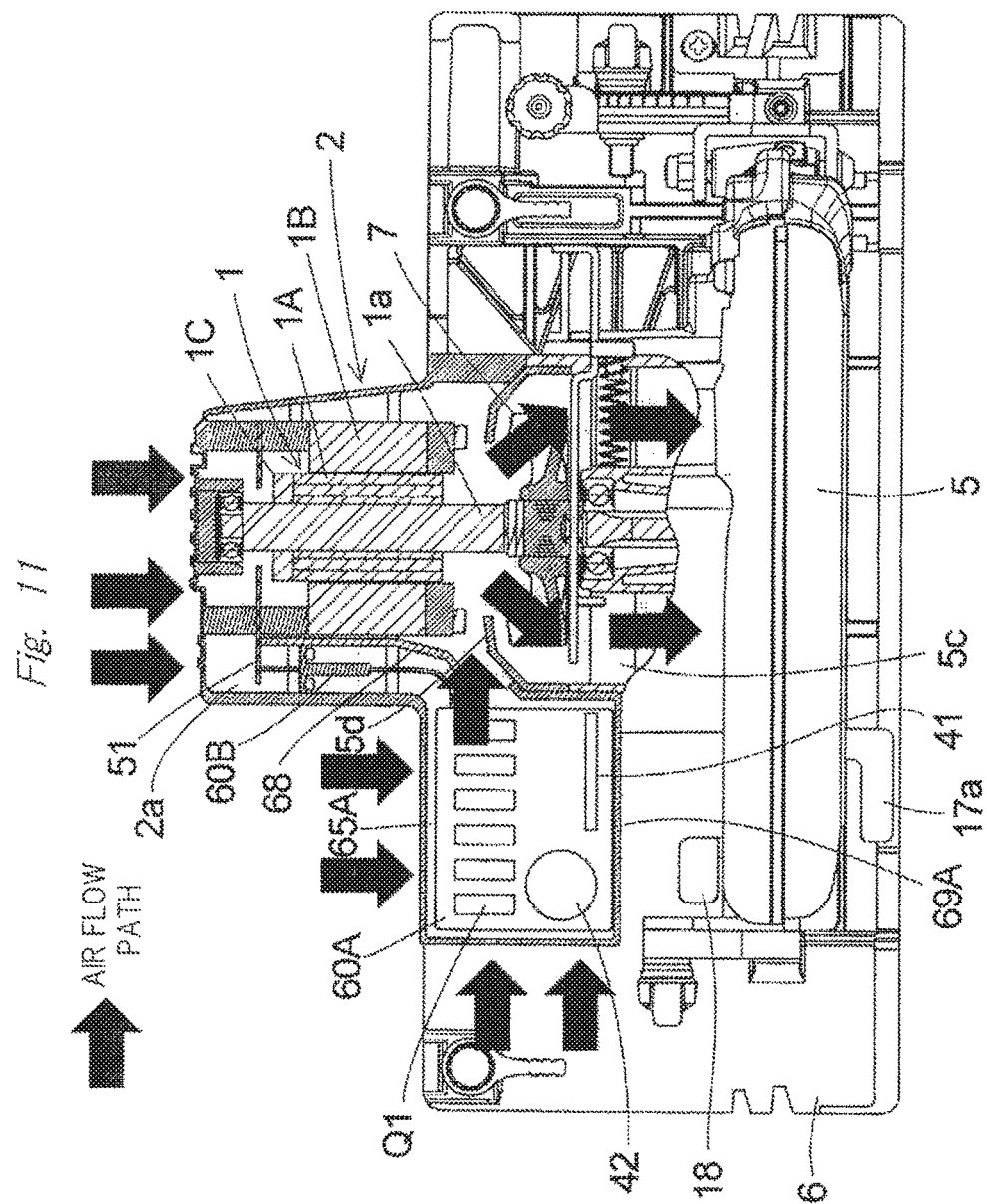
FIG. 11 is a plan view for describing an air flow path in the second embodiment, in which a principal part is seen in cross section.
Figure 12:
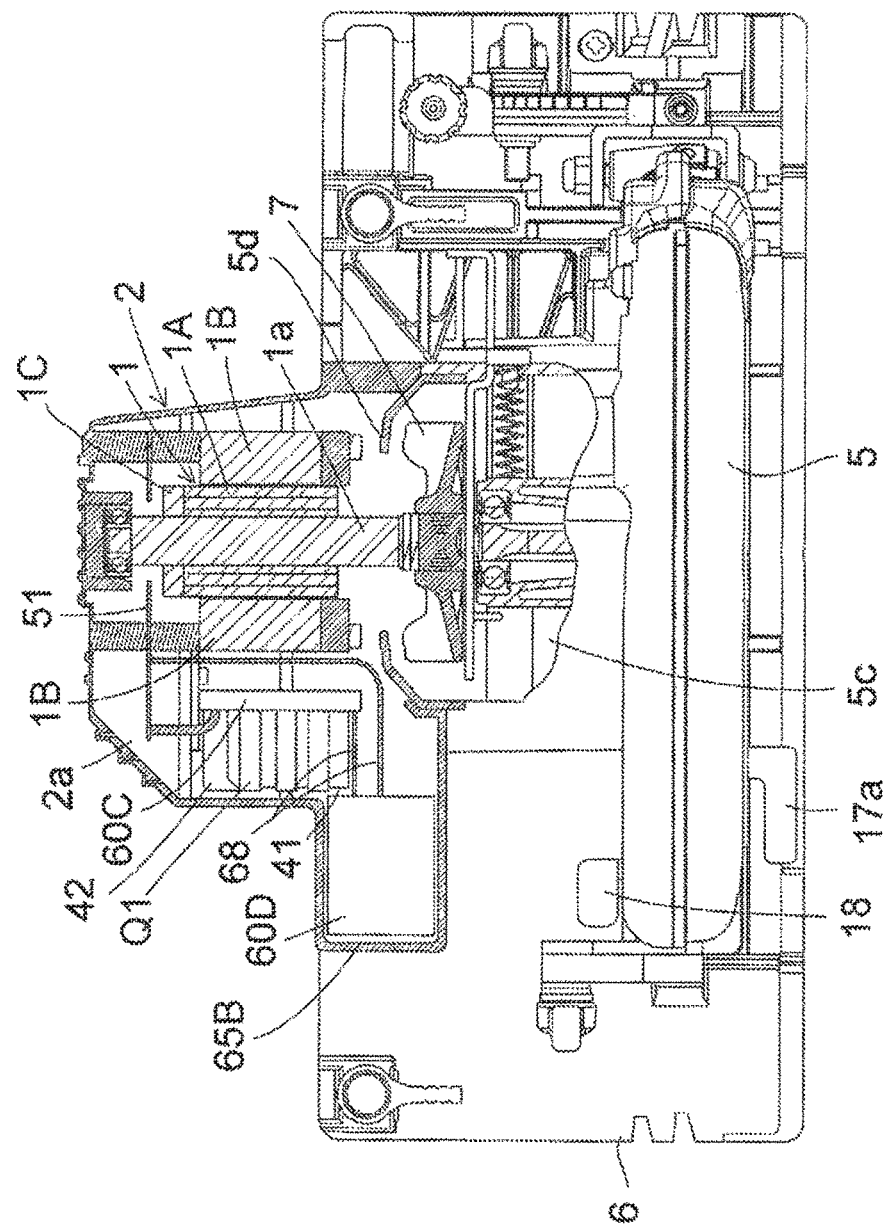
FIG. 12 is a plan view of a portable electric cutter of a third embodiment according to the present invention, in which a principal part is seen in cross section.
Figure 13:
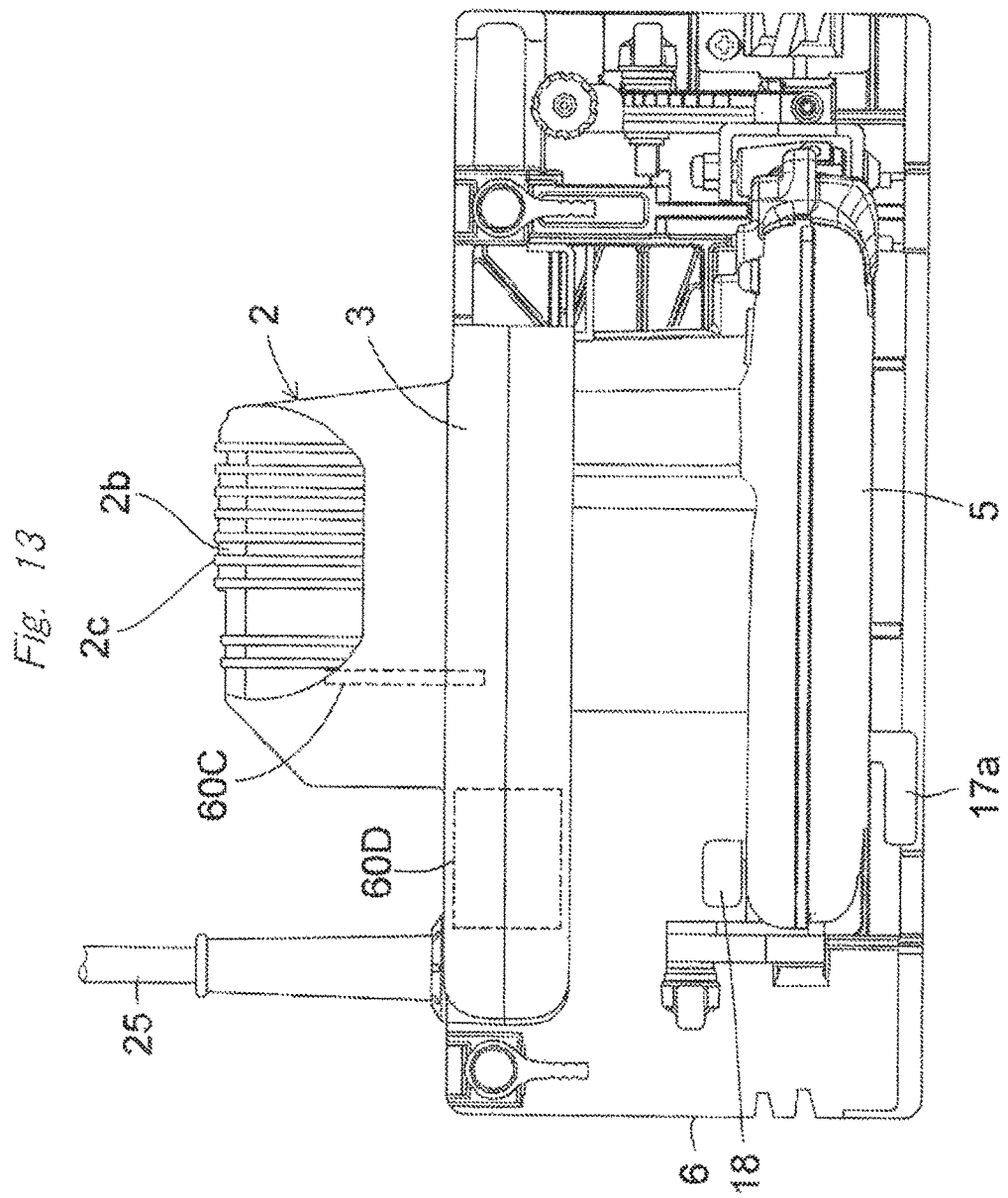
FIG. 13 is a plan view of the portable electric cutter of the third embodiment shown in FIG. 12.

The cooling of the brushless motor 1 and the cooling of the first and second circuit boards 60A and 60B after starting the brushless motor 1 are carried out in the manner shown in FIG. 11. More specifically, the centrifugal fan 7 attached and fixed to the output shaft 1*a* of the motor 1 is rotated, and the fan air for cooling is introduced to the motor casing 2*a* through the slit-like cooling air vents 2*b* at the back of the motor. The fan air introduced to the motor casing 2*a* passes through the space between the rotator 1A and the stator 1B of the motor 1 to cool the motor 1, enters the fan guide 5*d* through the outer side of the stator 1B while cooling the second circuit board 60B, and is then discharged to the saw cover 5 side through the fan air discharge port 5*c*.

Figure 9:
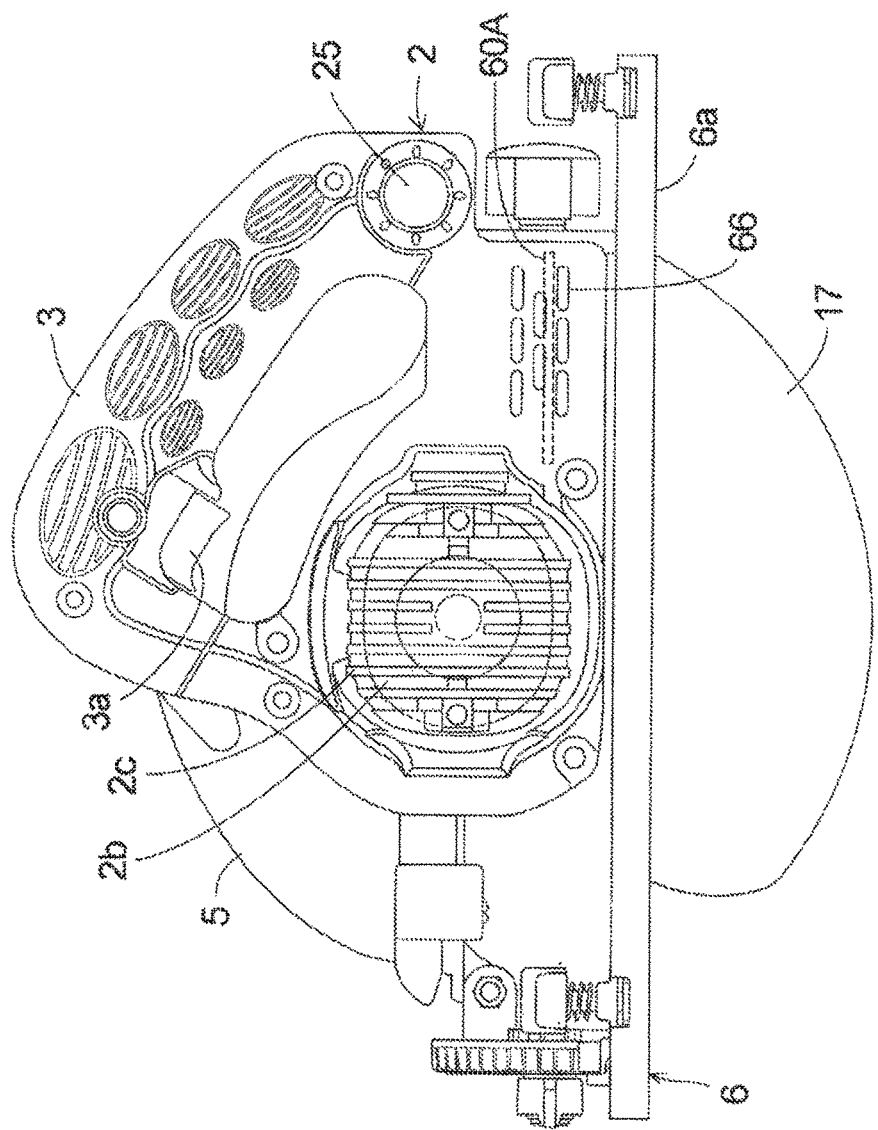
FIG. 9 is a back view of the portable electric cutter of the second embodiment shown in FIG. 7, in which illustration of a round saw blade is omitted.
Figure 10:
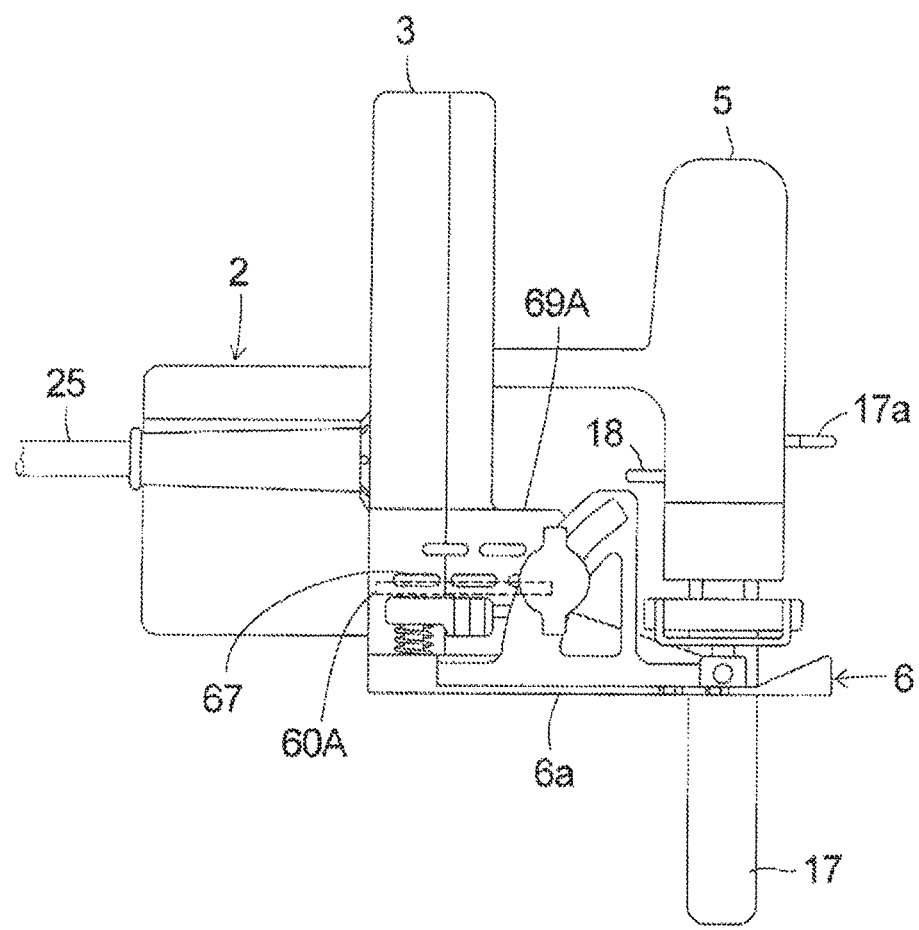
FIG. 10 is a side view of the portable electric cutter of the second embodiment shown in FIG. 7.

Since the inside of the fan guide 5*d* has the negative pressure relative to the circuit board casing 65A due to the rotation of the fan 7, the fan air is introduced to the circuit board casing 65A through the circuit board cooling air vents 66 and 67 shown in FIG. 9 and FIG. 10. The fan air introduced to the circuit board casing 65A passes through the circuit board casing 65A while cooling the first circuit board 60A on which the switching elements Q1 to Q6, the rectifier 41, the capacitor 42 and others are mounted, enters the motor casing 2*a*, and then reaches the inside of the fan guide 5*d*.

The effect of the second embodiment is substantially similar to that of the first embodiment. However, since the control circuit 30 is mounted on another board, the second embodiment is different from the first embodiment in that the area of the first circuit board 60A on which the driving circuit 20 and the rectifying and smoothing circuit 40 are mounted can be reduced and the amount of protrusion of the housing 2 to the saw cover 5 side can be reduced. Furthermore, since the control circuit 30 is mounted on another board, the influence from heat generating components such as the driving circuit 20 and the rectifying and smoothing circuit 40 can be suppressed. Moreover, since the second circuit board 60B on which the control circuit 30 is mounted is disposed near the sensor board 51, the electrical connection between the rotation position detection element 52 and the control circuit 30 in FIG. 17 can be shortened, so that it is possible to form the structure in which the influence of noise or the like can be suppressed.

A third embodiment of the present invention will be described with reference to FIG. 12 to FIG. 16. Since the third embodiment is substantially similar to the first embodiment except the cooling structure of the circuit board, the difference will be described below.

In the third embodiment, the driving circuit 20 of FIG. 17 is mounted on a first circuit board (first board) 60C, and the control circuit 30 is mounted on a second circuit board (second board) 60D. The second circuit board 60D is disposed at the position inside the housing 2 located between the handle 3 and the base 6, that is, in a circuit board casing 65B. The circuit board casing 65B is formed inside a part of the housing 2 located on a radially outer side of the fan 7 when the direction orthogonal to the rotation axis of the fan 7 is defined as the radial direction. Since the driving circuit 20 and the rectifying and smoothing circuit 40 are mounted on another board, the second circuit board 60B on which the control circuit 30 is mounted can be reduced in size, and the protruding portion (protruding toward the saw cover 5 side) provided for mounting the second circuit board 60D in a part of the housing 2 can be eliminated. Accordingly, the third embodiment is advantageous in operability. For example, the operation of the lever 18 which adjusts the amount of protrusion of the round saw blade 4 from the bottom surface of the base 6 in FIG. 12 and FIG. 16 can be facilitated.

The first circuit board 60C on which the driving circuit 20 and the rectifying and smoothing circuit 40 are mounted is disposed at the position away from the second circuit board 60D, for example, in the space between an inner wall of the motor casing 2*a* and the stator 1B of the motor 1. The circuit board cooling air vents 67 are formed also in the sidewall part of the motor casing 2*a*.

Figure 16:
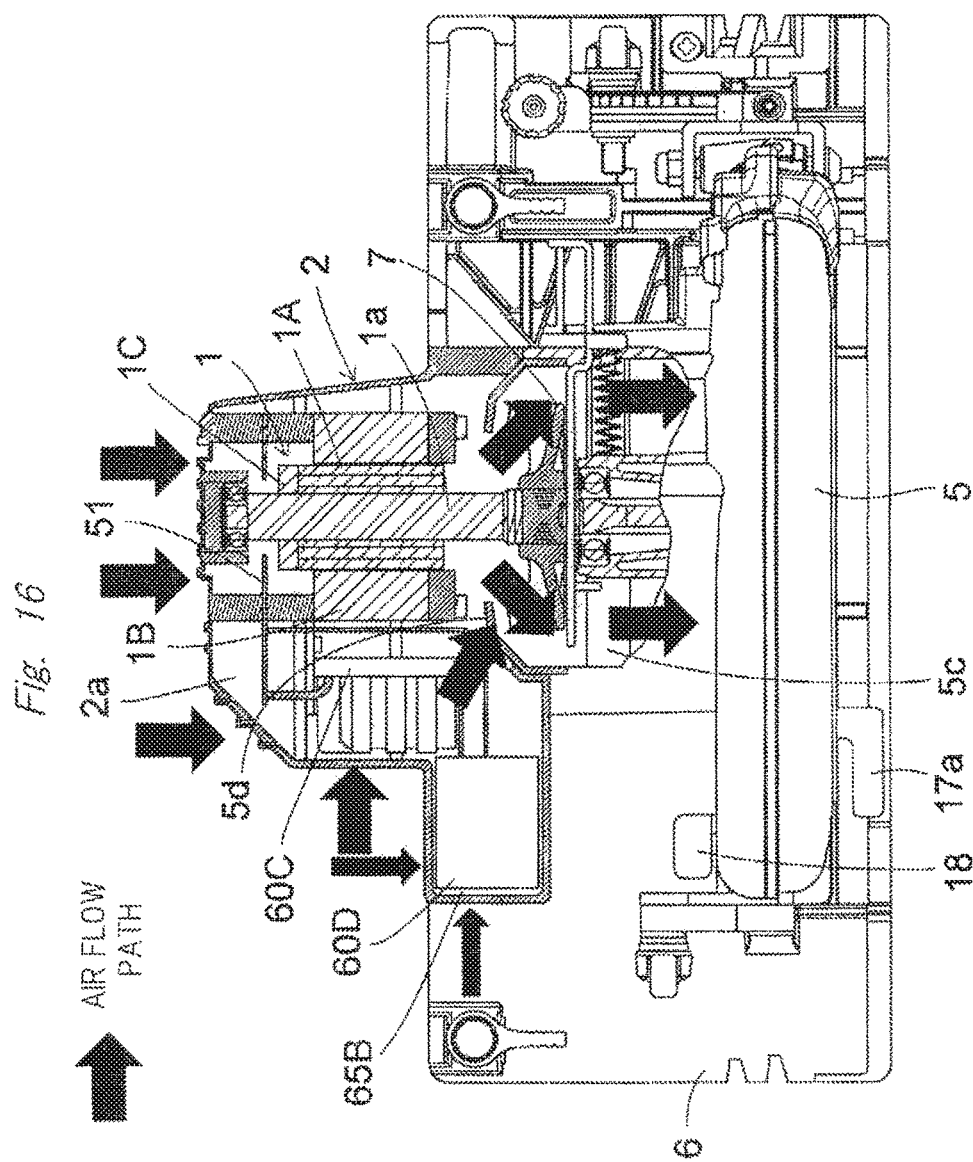
FIG. 16 is a plan view for describing an air flow path in the third embodiment, in which a principal part is seen in cross section.

The cooling of the brushless motor 1 and the cooling of the first circuit board 60C and the second circuit board 60D after starting the brushless motor 1 are carried out in the manner shown in FIG. 16. More specifically, the centrifugal fan 7 attached and fixed to the output shaft 1*a* of the motor 1 is rotated, and the fan air for cooling is introduced to the motor casing 2*a* through the slit-like cooling air vents 2*b* at the back of the motor 1. The fan air introduced to the motor casing 2*a* passes through the space between the rotator 1A and the stator 1B of the motor 1 to cool the motor 1, enters the fan guide 5*d* through the outer side of the stator 1B while cooling the first circuit board 60C on which the switching elements Q1 to Q6, the rectifier 41, the capacitor 42 and others are mounted, and is then discharged to the saw cover 5 side through the fan air discharge port 5c.

Figure 14:
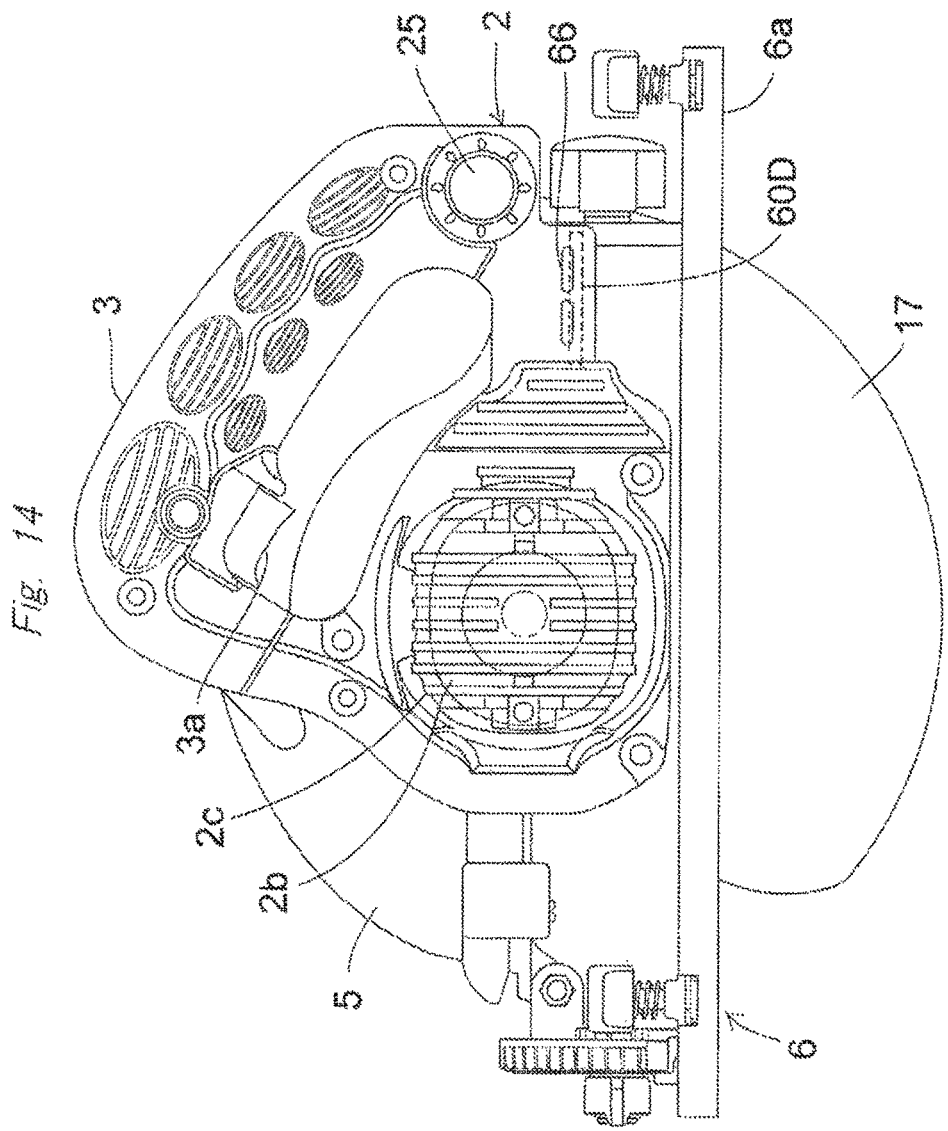
FIG. 14 is a back view of the portable electric cutter of the third embodiment shown in FIG. 12, in which illustration of a round saw blade is omitted.
Figure 15:
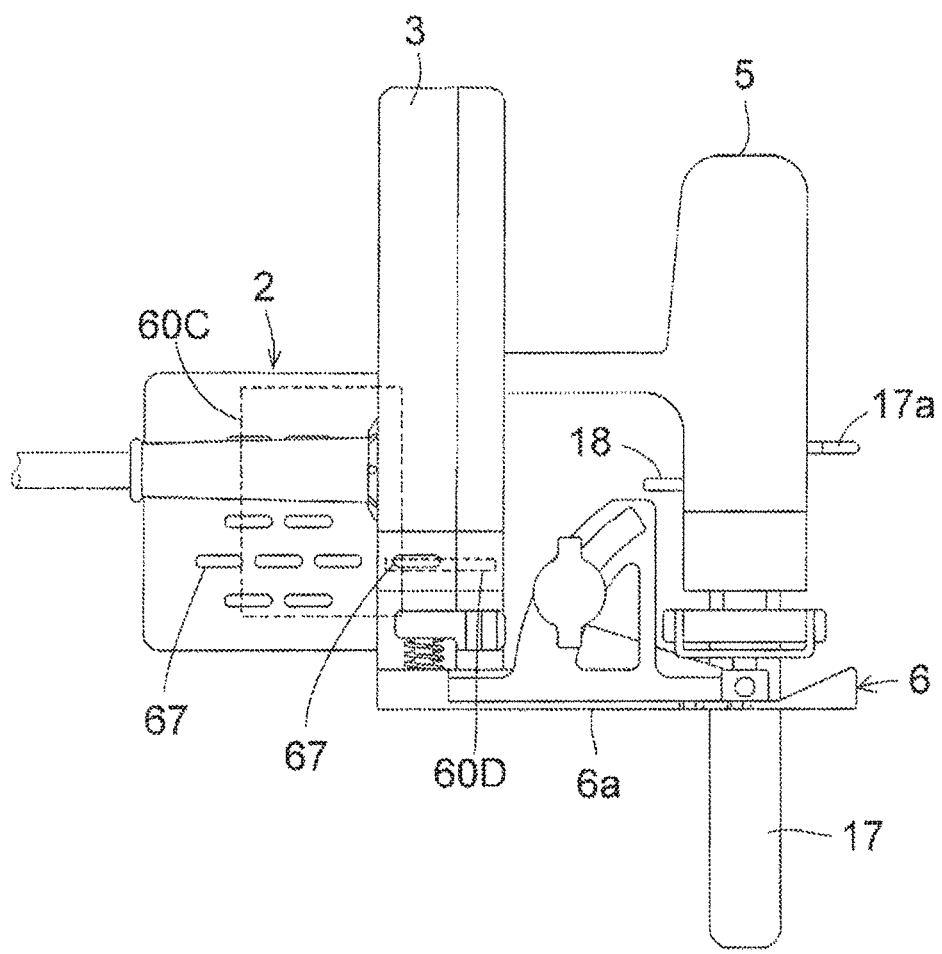
FIG. 15 is a side view of the portable electric cutter of the third embodiment shown in FIG. 12.

Since the inside of the fan guide 5d has the negative pressure relative to the circuit board casing 65B due to the rotation of the fan 7, the fan air is introduced to the circuit board casing 65B through the circuit board cooling air vents 66 and 67 shown in FIG. 14 and FIG. 15. The fan air introduced to the circuit board casing 65B passes through the circuit board casing 65B while cooling the second circuit board 60D, enters the motor casing 2a, and then reaches the inside of the fan guide 5d.

In the case of the third embodiment, since the control circuit 30 is mounted on another board, that is, the second circuit board 60D, the area of the second circuit board 60D can be reduced, and the circuit board casing 65B in which the second circuit board 60D is accommodated can also be made small, so that the amount of protrusion of the housing 2 to the saw cover 5 side can be further reduced. As a result, the operability of the lever 18 which adjusts the amount of protrusion of the round saw blade 4 from the bottom surface of the base 6 can be improved. Also, the first circuit board 60C on which the driving circuit 20 and the rectifying and smoothing circuit 40 are mounted is disposed at the position on a lateral side of the motor 1 inside the housing 2 and in a flow path of fan air. As described above, the circuit board 60C is disposed at a position on a lateral side of the motor 1 so as to extend in parallel to the output shaft 1a corresponding to the rotation axis of the motor 1. More specifically, since the first circuit board 60C is disposed on the lateral side of the motor 1 inside the motor casing 2a, sufficient fan air can be easily supplied.

In the foregoing, the present invention has been concretely described based on the embodiments. However, the person skilled in the art can understand that various modifications and alterations of the respective constituent elements and process steps in the embodiments can be made within the scope described in claims. A modified example will be briefly described below.

In the first embodiment, the circuit board 60 may have a structure made up of a plurality of boards stacked on each other, in which components of a driving circuit with large power consumption are mounted on an uppermost board and a control circuit with small power consumption is mounted on a lower board. In this case, it is possible to achieve the effect of reducing the floor space of the board.

The respective embodiments of the portable electric cutter will be collectively described below.

A portable electric cutter according to an embodiment is a portable electric cutter provided with a motor, the portable electric cutter includes a housing in which the motor is accommodated, a saw blade driven to rotate by the motor, a base coupled to the housing, having a bottom surface slidable on a material to be cut, and having an opening through which the saw blade can protrude downward from the bottom surface, a fan driven to rotate by the motor and cooling the motor by fan air generated by the rotation, a driving circuit including switching elements for switching power supplied to the motor, a control circuit for controlling the driving circuit, and a circuit board on which one or both of the driving circuit and the control circuit is mounted, and motor cooling air vents are provided in the housing on a side opposite to the saw blade, and circuit board cooling air vents are provided in the housing on the side opposite to the saw blade.

In a portable electric cutter according to another embodiment, the circuit board is disposed on a radially outer side of the fan when a direction orthogonal to a rotation axis of the fan is defined as a radial direction.

In a portable electric cutter according to another embodiment, the fan is accommodated in a motor casing in the housing together with the motor, an inside of the housing in which the circuit board is accommodated communicates with the motor casing, and the circuit board is disposed between circuit board cooling air vents provided in the housing and the motor casing.

In a portable electric cutter according to another embodiment, the driving circuit is mounted on a first board, the control circuit is mounted on a second board, the first board is disposed at a position inside the housing located between a handle of the housing and the base, and the second board is disposed at a position away from the first board.

In a portable electric cutter according to another embodiment, the driving circuit is mounted on a first board, the control circuit is mounted on a second board, the second board is disposed at a position inside the housing located between a handle of the housing and the base, and the first board is disposed at a position on a lateral side of the motor inside the housing and in a flow path of the fan air.

In a portable electric cutter according to another embodiment, a rectifier and a smoothing capacitor for converting AC power supply input into DC power for driving a brushless motor are further mounted on the first board.

In a portable electric cutter according to another embodiment, the motor is a brushless motor, a rotation state detection unit for generating a signal in accordance with a rotation position of the motor is provided, and the control circuit receives the signal of the rotation state detection unit and transmits a signal for controlling the drive of the motor to the driving circuit.

A portable electric cutter according to another embodiment is a portable electric cutter provided with a motor, the portable electric cutter includes a housing in which the motor is accommodated, a saw blade driven to rotate by the motor, a base coupled to the housing, having a bottom surface slidable on a material to be cut, and having an opening through which the saw blade can protrude downward from the bottom surface, a fan driven to rotate by the motor and cooling the motor by fan air generated by the rotation, a driving circuit including switching elements for switching power supplied to the motor, and a control circuit for controlling the driving circuit, and a circuit board on which one or both of the driving circuit and the control circuit is mounted is disposed at a position on a lateral side of the motor so as to extend in parallel to a rotation axis of the motor.

In a portable electric cutter according to another embodiment, at least a part of the circuit board is disposed at a position inside the housing located between a handle of the housing and the base and in a flow path of the fan air.

The invention claimed is:

1. A portable electric cutter comprising:
   a brushless motor having a rotator which rotates around a rotation axis;
   a housing in which the brushless motor is accommodated;
   a handle coupled to the housing, the handle extending in a direction orthogonal to a direction of the rotation axis;
   a circular saw blade driven to rotate by the brushless motor;
   a base coupled to the housing, having a bottom surface, and having an opening for the circular saw blade;
   a fan driven to rotate by the brushless motor and generate an air flow in the housing;

a driving circuit including switching elements for switching power supplied to the brushless motor;
a control circuit for controlling the driving circuit;
a first circuit board on which the driving circuit is mounted; and
a second circuit board on which the control circuit is mounted;
a motor casing that accommodates the brushless motor;
a motor cooling air vent provided at a sidewall part of the motor casing, the motor cooling air vent opening in the direction of the rotation axis of the brushless motor;
a circuit board casing disposed under the handle, the circuit board casing accommodating at least one of the first circuit board and the second circuit board; and
a circuit cooling air vent provided at a sidewall part of the circuit board casing, the circuit cooling air vent opening in the direction of the rotation axis, wherein
the switching elements are cooled by the air flow,
in a cutting direction of the portable electric cutter, the first circuit board and the second circuit board are disposed on a rear side of the brushless motor,
at least a part of either one of the first circuit board and the second circuit board is disposed under the handle so as to overlap the handle when viewed from above the portable electric cutter and to be disposed in a circuit cooling air path that connects the circuit cooling vent and the fan, and
at least a part of the brushless motor is disposed in a motor cooling air path that connects the motor cooling vent and the fan.

2. The portable electric cutter according to claim 1, wherein a distance between the first circuit board and an axis of the brushless motor and a distance between the second circuit board and the axis of the brushless motor are different from each other.

3. The portable electric cutter according to claim 2, wherein a plane including the first circuit board and a plane including the second circuit board cross each other.

4. The portable electric cutter according to claim 3, wherein the first circuit board is disposed closer to the brushless motor than the second circuit board in the cutting direction.

5. The portable electric cutter according to claim 1, wherein
the handle extends along a direction perpendicular to a rotational axis of the brushless motor, and
the first circuit board extends in the direction perpendicular to the rotational axis of the brushless motor and extends in a direction along the rotational axis of the brushless motor.

6. The portable electric cutter according to claim 5, wherein at least a part of the first circuit board is disposed on a radially outer side of the fan, wherein a direction orthogonal to a rotation axis of the fan is defined as a radial direction.

7. A portable electric cutter comprising:
a brushless motor having a rotator which rotates around a rotation axis;
a housing in which the brushless motor is accommodated;
a handle coupled to the housing, the handle extending in a direction orthogonal to a direction of the rotation axis;
a circular saw blade driven to rotate by the brushless motor;
a base coupled to the housing, having a bottom surface, and having an opening for the circular saw blade;
a fan driven to rotate by the brushless motor and generate an air flow in the housing;
a driving circuit including switching elements for switching power supplied to the brushless motor;
a control circuit for controlling the driving circuit;
a first circuit board on which the driving circuit is mounted;
a second circuit board on which the control circuit is mounted;
a motor casing that accommodates the brushless motor;
a motor cooling air vent provided at a sidewall part of the motor casing;
a circuit board casing disposed under the handle, the circuit board casing accommodating at least one of the first circuit board and the second circuit board; and
a circuit cooling air vent provided at a sidewall part of the circuit board casing, wherein
the circuit board casing includes an upper wall facing the handle and a vertical wall extending toward the base from the upper wall,
the circuit cooling air vent is provided at the vertical wall,
in a cutting direction of the portable electric cutter, the first circuit board and the second circuit board are disposed on a rear side of the brushless motor,
at least a part of either one of the first circuit board and the second circuit board is disposed under the handle so as to overlap the handle when viewed from above the portable electric cutter and to be disposed in a circuit cooling air path that connects the circuit cooling vent and the fan, and
at least a part of the brushless motor is disposed in a motor cooling air path that connects the motor cooling vent and the fan.

* * * * *